United States Patent
Hosouchi et al.

(10) Patent No.: US 6,591,052 B1
(45) Date of Patent: Jul. 8, 2003

(54) EXCESSIVE LENGTH TREATMENT AND CARTRIDGE FOR OPTICAL FIBERS USED IN ELECTRIC EQUIPMENT

(75) Inventors: Nobuyuki Hosouchi, Kawasaki (JP); Hiroshi Takawa, Kawasaki (JP); Takao Asai, Kawasaki (JP); Hideaki Matsumoto, Kawasaki (JP); Michiya Kitajima, Kawasaki (JP); Miho Inada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/512,244

(22) Filed: Feb. 24, 2000

(30) Foreign Application Priority Data

Jun. 30, 1999 (JP) .......................................... 11-186571

(51) Int. Cl.⁷ ................................................ G02B 6/00
(52) U.S. Cl. ....................................... 385/135; 385/134
(58) Field of Search ................................. 385/134, 135, 385/136, 137

(56) References Cited

U.S. PATENT DOCUMENTS 5,129,030 A * 7/1992 Petrunia ...................... 385/135

FOREIGN PATENT DOCUMENTS

JP 411109140 A * 4/1999

* cited by examiner

Primary Examiner—Euncha Cherry
(74) Attorney, Agent, or Firm—Katten Muchin Zavis Rosenman

(57) ABSTRACT

A telecommunication apparatus includes a shelf and a plurality of packages. Optical fibers are laid around a rear surface of the shelf in a direction of Z2. Each of the optical fibers is dragged in a direction of X1 into a corresponding cartridge from a rear surface thereof. The cartridge is provided near an upper side of the rear surface as an excessive length treating portion. Then the optical fiber is drawn out of an upper surface of the cartridge so as to enter a space formed in the upper shelf from the rear surface thereof. After that, the optical fiber is extended and connected to an optical plug provided on a front portion of the package.

7 Claims, 10 Drawing Sheets

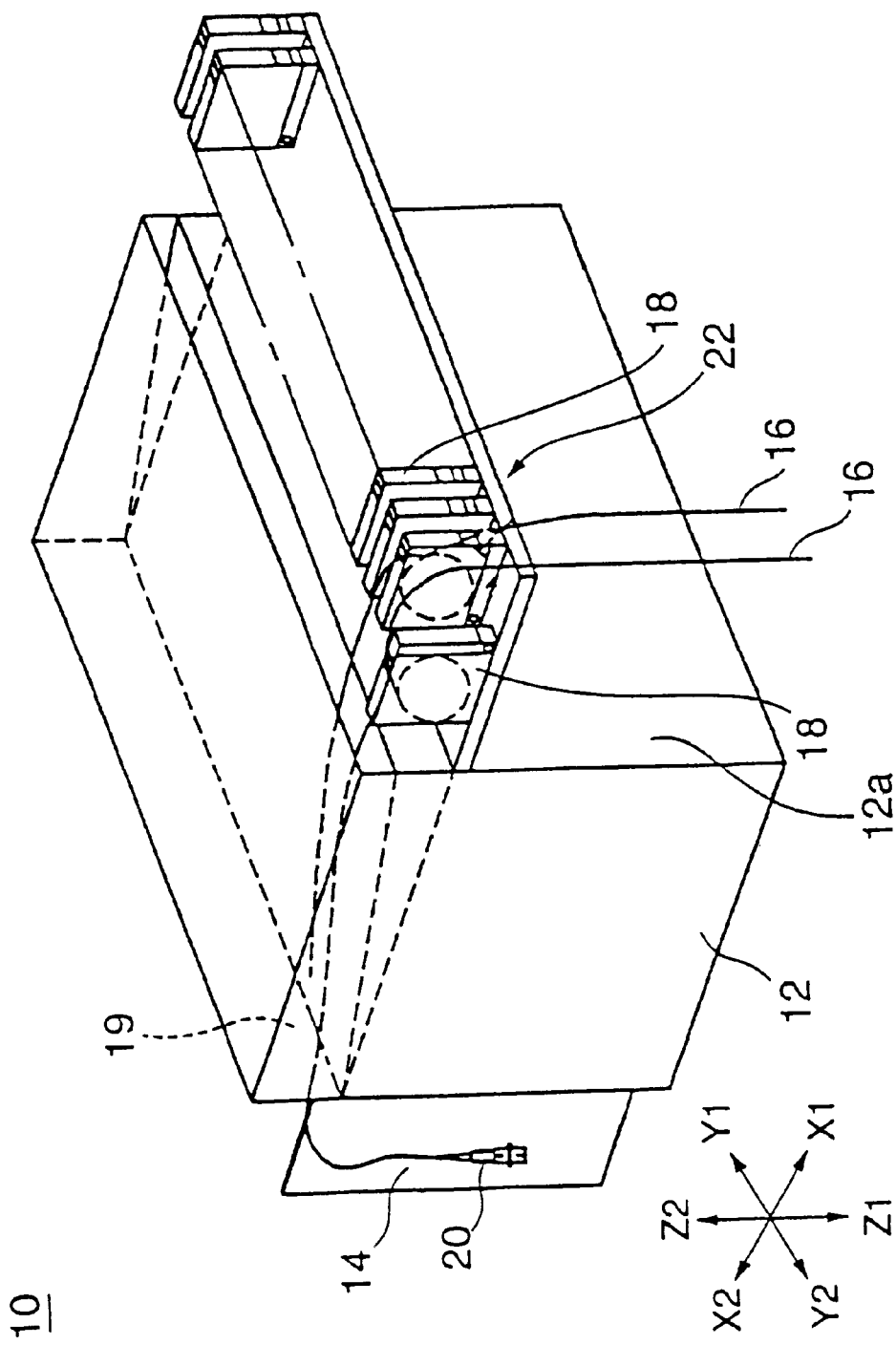

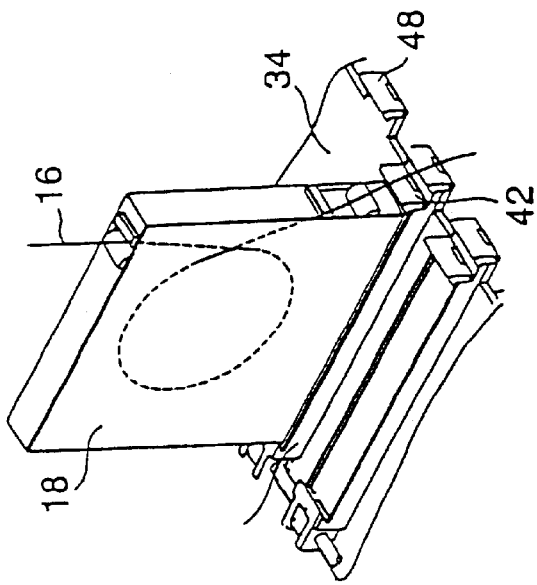
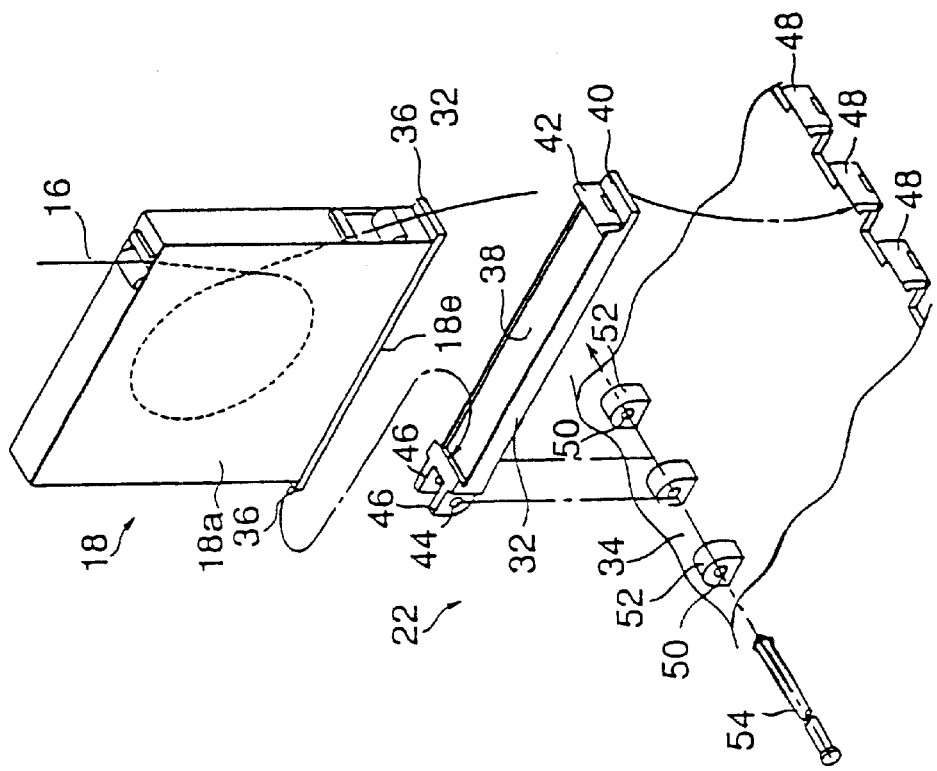

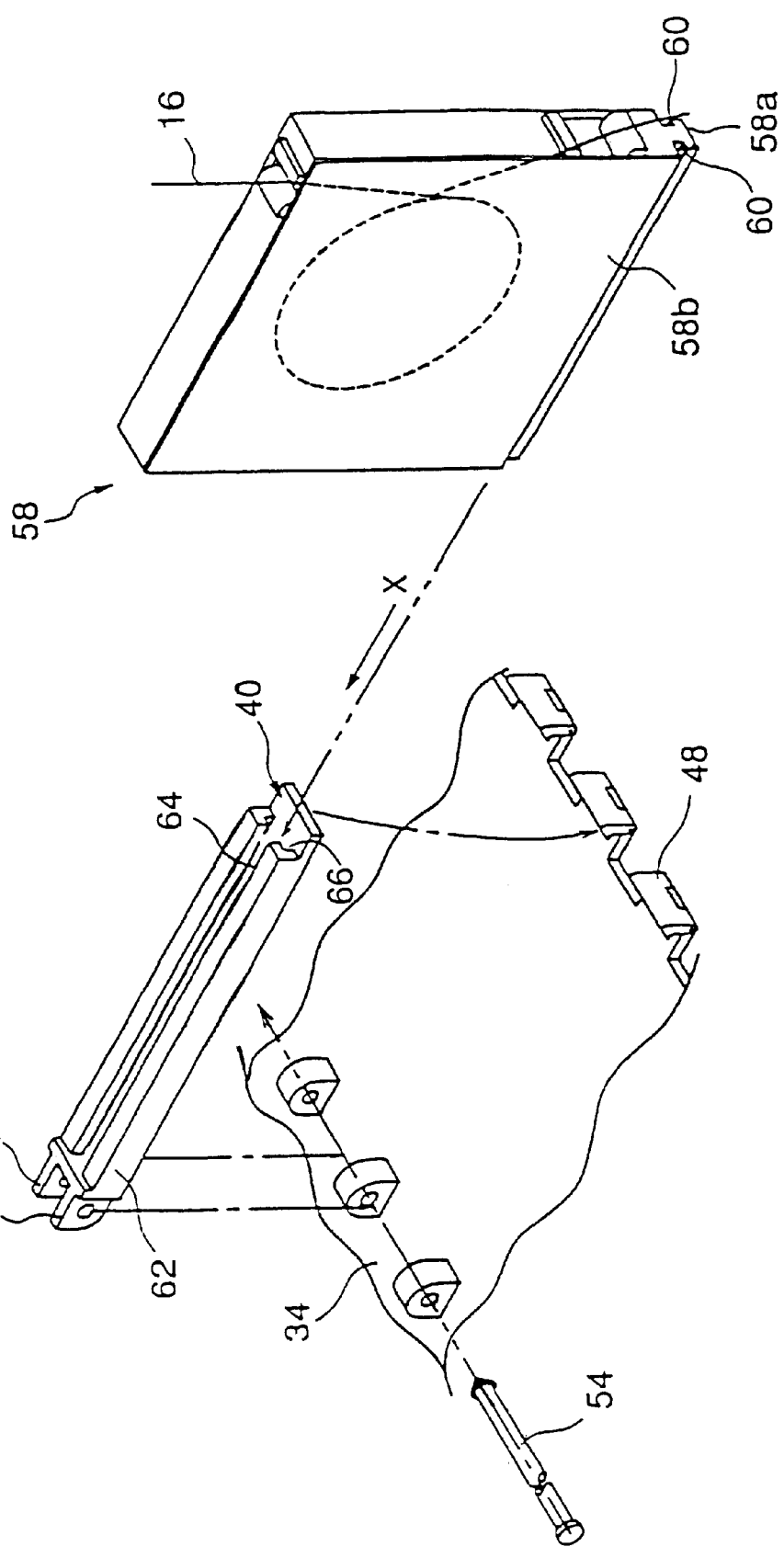

EXCESSIVE LENGTH TREATMENT AND CARTRIDGE FOR OPTICAL FIBERS USED IN ELECTRIC EQUIPMENT

BACKGROUND OF THE INVENTION

1. Field of the Invention

The present invention relates to an excessive length treatment structure for optical fibers used in electric equipment, for example, in a telecommunication apparatus.

2. Description of the Related Art

With the advent of the full-scale multimedia era in the 21st century, optical fibers are being laid into our homes. This may be called "FTTH" (Fiber To The Home).

In order to support such a "FTTH" situation, telecommunication lines are required to have a great capacity. When the number of the optical fibers used in telecommunication apparatuses laid in offices is tremendously increased, it brings about a problem that the telecommunication apparatuses become congested with the optical fibers and a treatment for this is troublesome.

FIGS. 1A and 1B show two types, a front access type and a rear access type, of a conventional method for introducing optical fibers into a telecommunication apparatus. In the case of the front access type shown by FIG. 1A, optical fibers 3, which are laid in a vertical direction along sides 2a of shelves 2 of a telecommunication apparatus 1, are dragged into the inside of the shelves 2 from positions adjacent to surfaces 2b thereof. In the case of the rear access type shown by FIG. 1B, on the other hand, the optical fibers 3, which are laid in the vertical direction along rear surfaces of the shelves 2, are dragged into the inside of the shelves 2 from the rear surfaces thereof. Positions of dragging the optical fibers thereinto are not shown.

With regard to the above-mentioned two types, the front access type is mostly used abroad and the rear access type is mostly used in Japan.

Next, a description is given in detail of a telecommunication apparatus using the rear access type with reference to FIG. 2 and FIGS. 3A through 3C.

FIG. 2 is a sectional side view partly showing the inside of the telecommunication apparatus 1. A package 4, which is formed of a substrate module, is accommodated within the shelf 2. A plurality of supporting members 5a are mounted on the shelf 2, extending backwards from the rear surface thereof. A plurality of supporting stands 5b are vertically mounted on respective end portions of the supporting members 5a. The supporting member 5a and the supporting stand 5b are integrally formed.

Thus, space portions A between the rear surface of the shelf 2 and the supporting stands 5b are formed. Within these space portions A, electric cables, which are used for connecting to electric parts arranged in the shelf 2, are laid (not shown). A plurality of the optical fiber 3 are accommodated on the supporting stands 5b, and as shown in FIG. 2 are extended upwards and are dragged into the inside of the shelf 2 from the upper rear surface of the shelf 2.

On the upper shelf 2, there is formed a space 7 which is divided by an inclined plate 8. The optical fibers 3 are extended along the inclined plate 8 so as to be connected to an optical plug 9 which is provided on the upper end portion of the package 4 near the front side of the shelf 2.

In addition, a plurality of apertures (not shown) are formed on a boundary between the space 7 and the package 4. A cooling fan (not shown) is provided in the shelf 2. Heated air, which is generated by the package 4 when the telecommunication apparatus 1 is in use, is discharged, through these apertures and along the inclined plate 8 and further through an aperture (not shown) formed on the upper rear surface of the shelf 2, to the outside.

FIGS. 3A through 3C show the telecommunication apparatus 1 observed from other directions. That is, FIG. 3A is a fragmentary elevation, FIG. 3B is a fragmentary plan view and FIG. 3C is a fragmentary rear elevation.

The telecommunication apparatus comprises excessive length treating portions 6a to 6c which serve to store excessive lengths of the optical fibers 3 by winding the excessive lengths of the optical fibers 3 thereon, so that the excessive lengths are not troublesome. Specifically, as shown in FIG. 3C, the optical fibers 3, in this embodiment, are wound and attached at three excessive length treating portions (excessive length accommodating bodies) 6c which are provided on the rear surface of the shelf 2. Most of the excessive lengths of the optical fibers 3 to be connected to the telecommunication apparatus are thus stored by the excessive length treating portions 6c.

On the other hand, as shown in FIGS. 3A and 3B, the excessive lengths of the optical fibers 3 are just wound and not fixed at the excessive length treating portions 6a and 6b which are provided on the upper portion of the shelf 2 and on the upper front of the shelf 2, respectively.

In a case where the package 4 is exchanged with another package, the package 4 is drawn out of the front of the shelf 2. At this time, while the package 4 is drawn out, the optical fibers 3 are pulled via a plug 9 connected to a connecting adapter (not shown) fixed to the package 4, and the optical fibers 3 wound on the excessive length treating portions 6a and 6b are thereby pulled and extended so that the package 4 can be smoothly drawn out. After the optical plug 9 connected to the optical fibers 3 is detached from the connecting adapter, the package 4 is removed from the shelf 2.

However, in the above-mentioned conventional telecommunication apparatus 1 of the rear access type, when a plurality of the optical fibers 3 are present, the optical fibers 3 being collected and bound at the excessive length treating portions 6a to 6c become troublesome. This is particularly obvious at the excessive length treating portions provided on the upper front of the shelf 2 and on the upper portion of the shelf 2 as shown in FIGS. 3A and 3B. For this reason, for example, when an optical fiber 3 is added to or removed from the shelf 2, it is difficult to identify which is the optical fiber 3. And when the package 4 is drawn out of the front of the shelf 2, the optical fibers 3 connected to the optical plug 9 may be stretched and the wound optical fibers 3 may exceed their allowable bending strengths and thereby become bent.

SUMMARY OF THE INVENTION

It is a general object of the present invention to provide an excessive length treatment structure for optical fibers used in electric equipment including the use of cartridge containers, in which the above disadvantages are eliminated.

Another and more specific object of the present invention is to provide an excessive length treatment structure for optical fibers used in electric equipment, in which a plurality of packages, each of which essentially consist of a substrate module, are accommodated within a shelf, and optical fibers are introduced into said shelf from a rear side thereof opposite to a side from which said packages are drawn out, so as to connect to a corresponding one of said packages via an optical plug at a front side of said shelf, comprising:

a plurality of cartridges which are provided on said rear side of said shelf for accommodating excessive length parts of said optical fibers.

Still another object of the present invention is to provide a cartridge for use in an excessive length treatment structure for optical fibers used in electric equipment, in which a plurality of packages, each of which houses a substrate module, are accommodated within a shelf, optical fibers are introduced into said shelf from a rear side thereof opposite to a side from which said packages are drawn out, so as to connect to a corresponding one of said packages via an optical plug at a front side of said shelf, comprising:

a reel built therein, said reel having a desired diameter on which said optical fiber is wound without exceeding an allowable bending strength, excessive length part of said optical fiber being stored by said reel.

Using the excessive length treatment structure including the use of cartridges, the optical fibers are laid out in an orderly manner, can be identified one by one, and therefore the operation of adding or removing an optical fiber to or from a package can be easily and certainly performed. Hence, when the package is mounted on or removed from a shelf as described above, the optical fibers do not exceed their allowable bending strengths and thereby do not become bent.

Other objects, features and advantages of the present invention will become more apparent from the following detailed description when read in conjunction with the accompanying drawings.

BRIEF DESCRIPTION OF THE DRAWINGS

FIG. 4 shows a schematic perspective view showing a telecommunication apparatus using an excessive length treatment structure of optical fibers used therein according to one embodiment of the present invention;

FIGS. 8A and 8B are diagrams illustrating a method for carrying the cartridge on a cartridge carrying portion according to the embodiment of the present invention, FIG. 8A is an exploded perspective view of the cartridge and the cartridge carrying portion, and FIG. 8B is a perspective view showing a state where the cartridge is carried on the cartridge carrying portion;

FIG. 9 is a perspective view showing the cartridge and the cartridge carrying portion according to a modification of the present invention; FIG. 10A showing a state in which a package is accommodated in a shelf and the telecommunication apparatus is connected, FIG. 10B showing a state in which the package is drawn out of the shelf by a predetermined distance, FIG. 10C showing a state in which the package is completely removed from the shelf, FIG. 10D showing a state immediately after the package is installed in the shelf again, FIG. 10E showing a state in which the cartridge has rotated to its normal position after the package has been installed.

DETAILED DESCRIPTION OF THE PREFERRED EMBODIMENT

A description will now be given of a preferred embodiment of an excessive length treatment structure using a cartridge for optical fibers used in electric equipment according to the present invention with reference to the drawings.

Figure 1A:
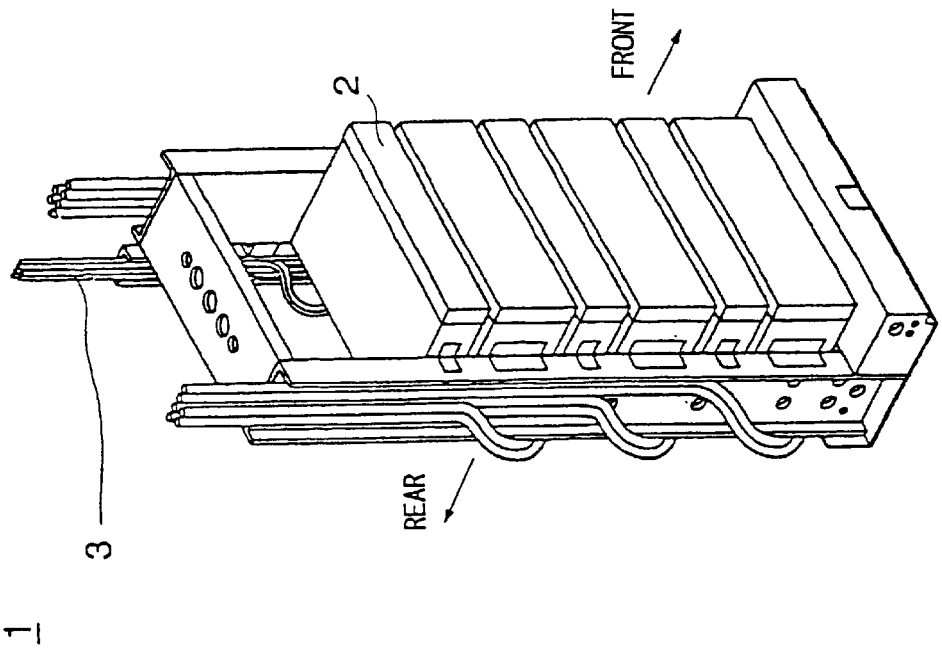
FIGS. 1A and 1B show two types, a front access type and a rear access type, of a conventional method for introducing optical fibers into a telecommunication apparatus.
Figure 1B:
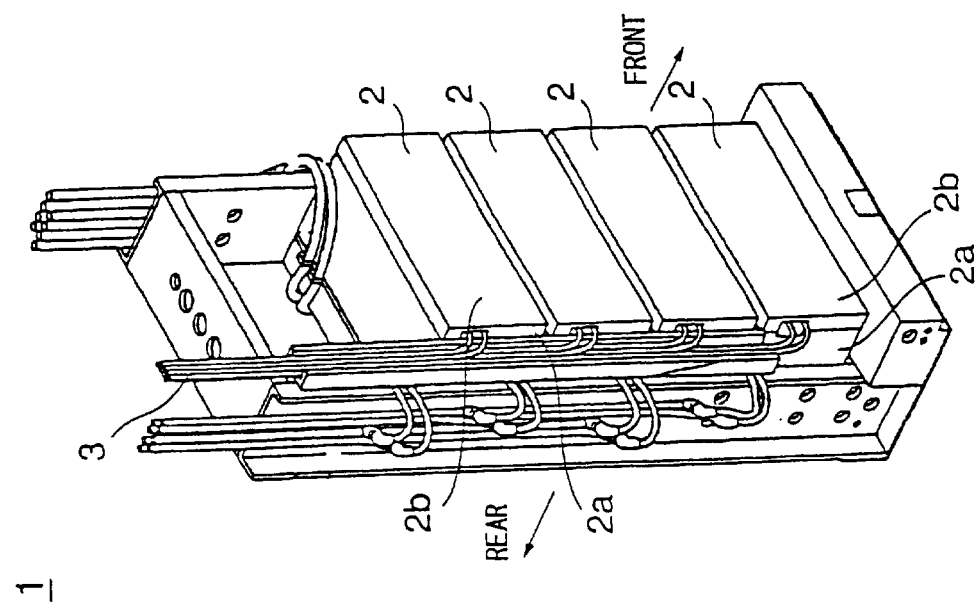

FIG. 4 shows a schematic perspective view of a telecommunication apparatus 10 including an excessive length treatment structure of optical fibers used therein according to the preferred embodiment of the present invention. In this drawing, the telecommunication apparatus 10 is shown only as one unit, but as shown in FIGS. 1A and 1B is usually composed of a plurality of units stacked vertically in a Z1–Z2 direction.

In this embodiment, the telecommunication apparatus 10 comprises a shelf 12, and a plurality of packages 14 accommodated in the shelf 12. The packages 14 are each formed of a substrate module. In this case, a plurality of the packages 14 are arranged in a Y1–Y2 direction within the shelf 12. Also, FIG. 4 shows a state where the package 14 is drawn out of the front of the shelf 12 in a X2 direction.

Optical fibers 16 are laid around a rear surface 12a of the shelf 12 in a direction of Z2. Each of the optical fibers 16 is dragged in a direction of X2 into a corresponding cartridge 18 from a rear surface thereof. The cartridge is provided near an upper side of the rear surface 12a as an excessive length treating portion. Then the optical fiber 16 is drawn out of an upper surface of the cartridge 18 so as to enter a space 19 formed in the upper shelf 12 from the rear surface 12a thereof. After that, the optical fiber 16 is extended and connected to an optical plug 20 provided on a front portion of the package 14.

Figure 2:
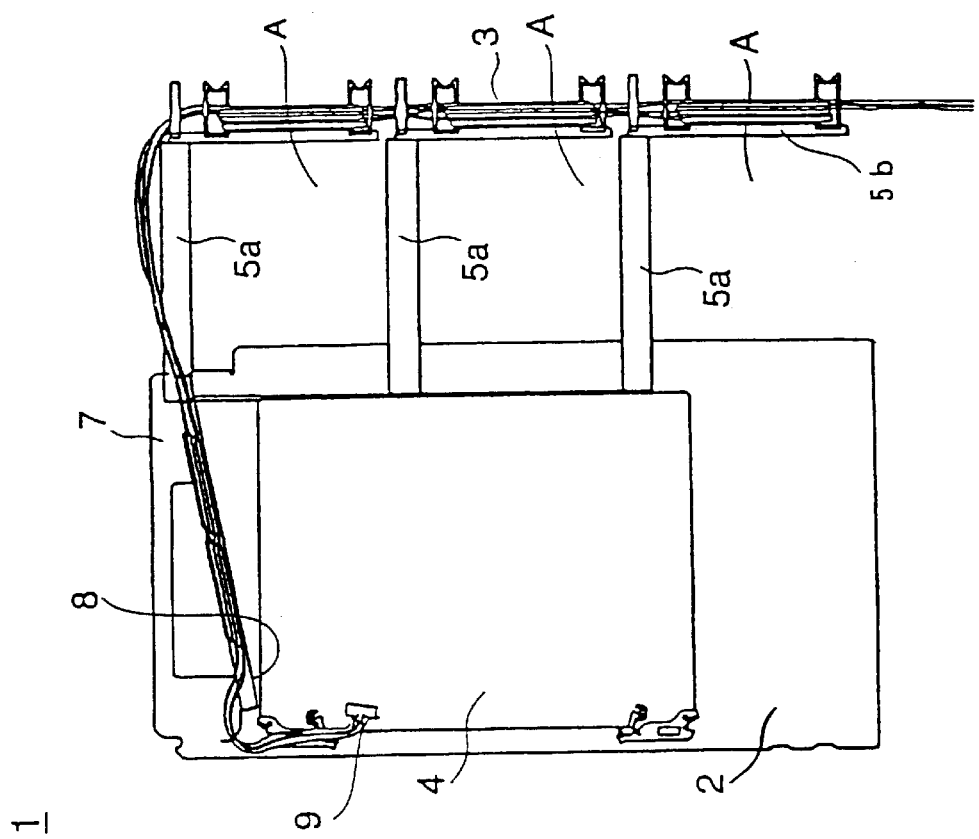
FIG. 2 is a sectional side view partly showing the inside of the telecommunication apparatus of the rear access type.
Figure 3A:
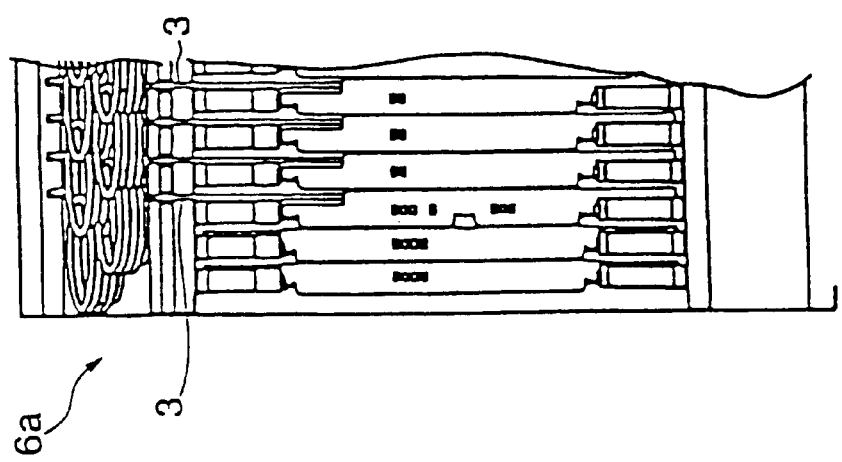
FIGS. 3A through 3C show the conventional telecommunication apparatus of the rear access type, FIG. 3A being a fragmentary elevation, FIG. 3B being a fragmentary plan view, FIG. 3C being a fragmentary rear elevation.
Figure 3B:
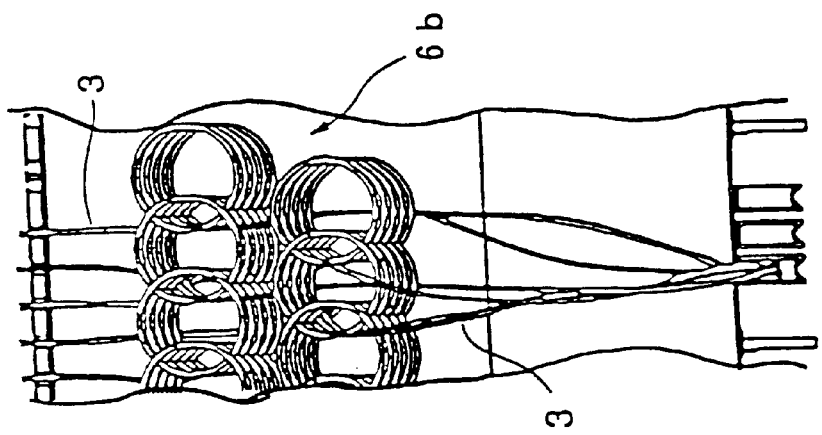
Figure 3C:
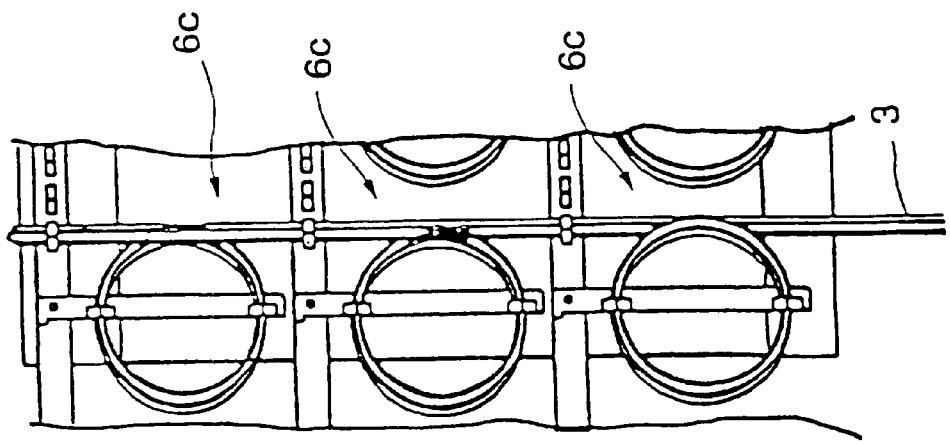

Herein, the cartridge 18, which is paired with a corresponding one of the packages 14, is carried on a cartridge carrying portion 22 which is shaped like a flat plate and long enough to receive a plurality of the cartridges 18 to be installed. A side surface of the cartridge carrying portion 22 is fixed on the rear surface 12a of the shelf 12. In this case, since the cartridges 18 and the cartridge carrying portion 22 are arranged in a space approximately equal to the spaces A which, as shown in FIG. 2, is the space required in the conventional method for handling excessive optical fibers, no additional space is required for the preferred embodiment of the present invention compared to the conventional method. In addition, the cartridges 18 and the cartridge carrying portion 22 do not interfere with cables (not shown) laid on the rear surface 12a of the shelf 12, so that no additional space is required for them.

Herein, the cartridges 18 are configured to be able to rotate 90° (see the closest cartridge 18 of FIG. 4), so that even though additional space as large as the cartridges 18 is shown in this embodiment, it is not essential to the current invention.

In addition, the optical plug 20 is connected to both the optical fiber 16 and a connecting adapter (not shown) fixed on the package 14. Also, by attaching or detaching the optical plug 20 to or from the connecting adapter, the optical fiber 16 can be connected to or disconnected from the package 14.

Figure 5:
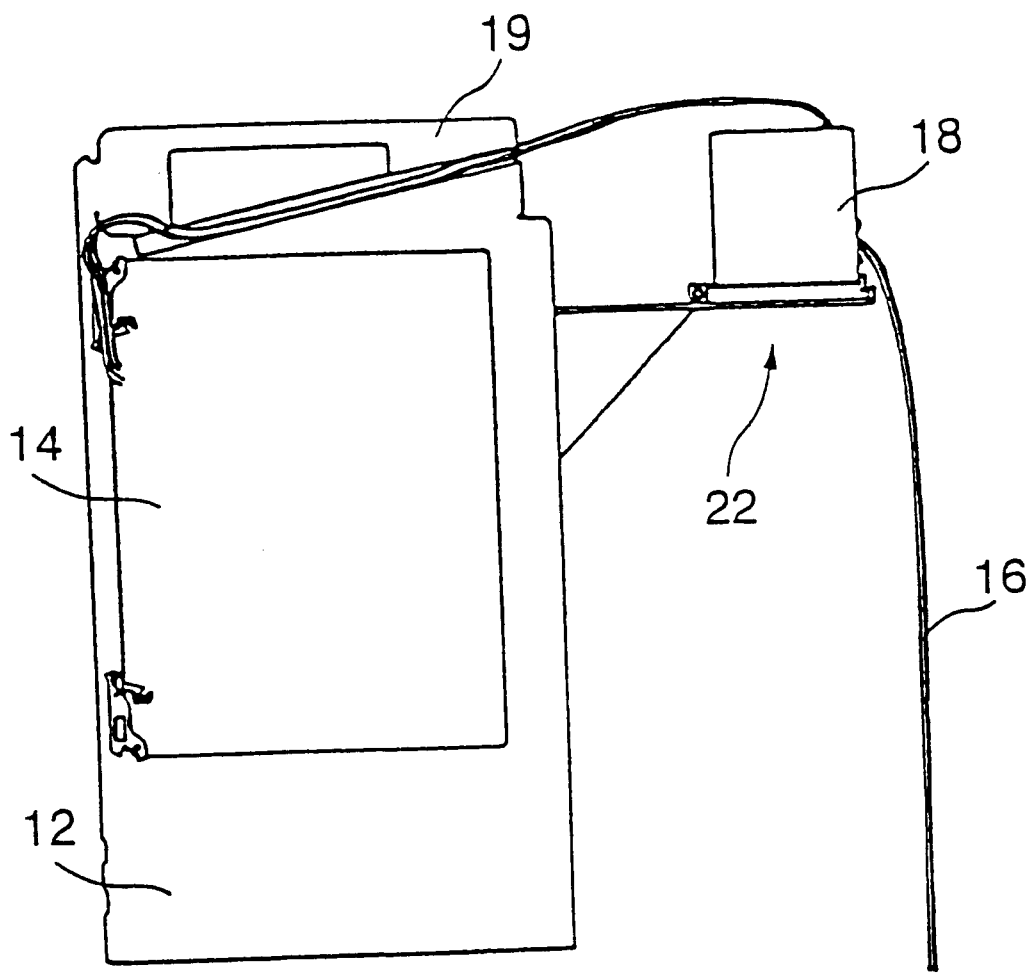
FIG. 5 is a perspective view showing the telecommunication apparatus of FIG. 4.
Figure 6C:
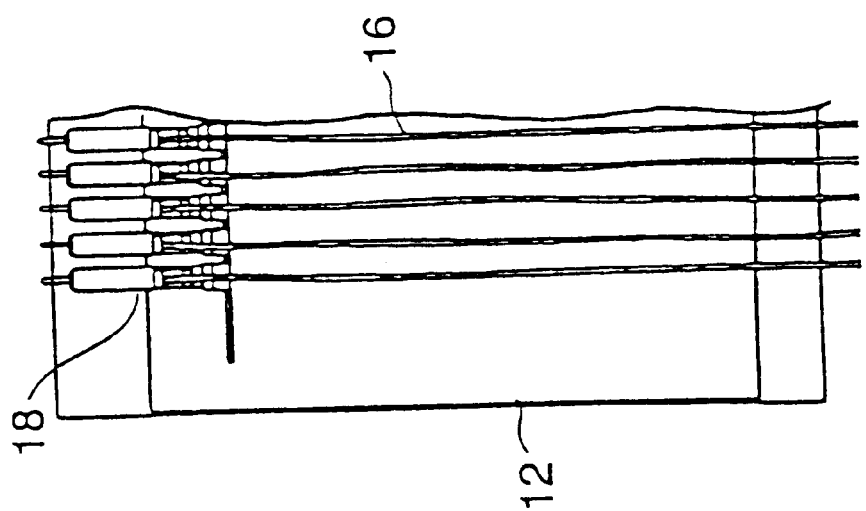
FIGS. 6A through 6c show a fragmentary elevation, a fragmentary plan view, and a fragmentary rear elevation of the telecommunication apparatus of FIG. 4, respectively.
Figure 6B:
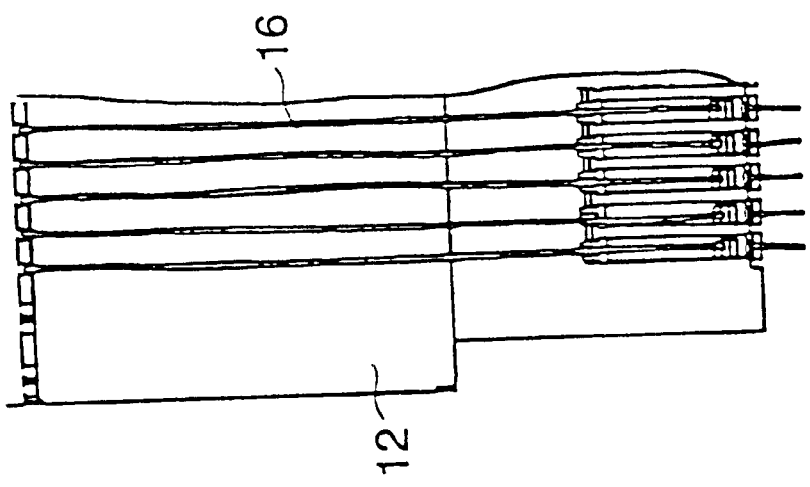
Figure 6A:
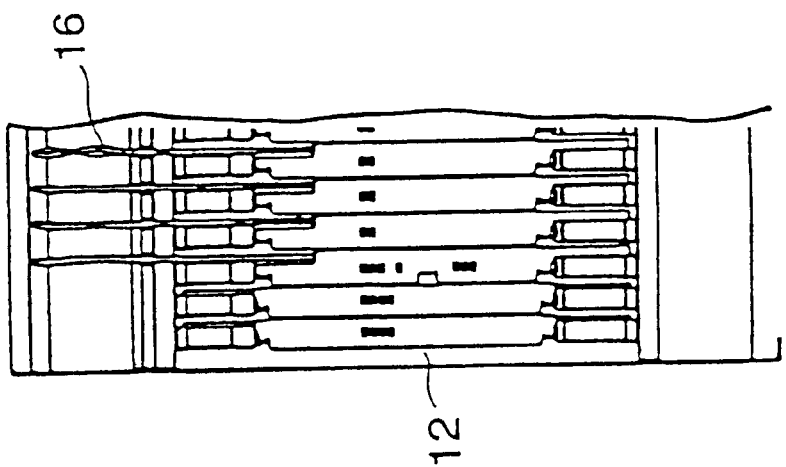

FIG. 5 is a perspective view showing the telecommunication apparatus 10. FIGS. 6A through 6c show a fragmentary elevation, a fragmentary plan view, and a fragmentary rear elevation, respectively, of the telecommunication apparatus 10.

In the present invention, as shown in FIG. 5 and FIGS. 6A through 6C, since all excessive lengths of the optical fibers 16 are accommodated in the cartridges 18 in a well-ordered manner, there are no places where the wound optical fibers are exposed. Thus, the optical fibers 16 can be correctly identified one by one, and as a result the operation of adding or removing the optical fibers 16 to or from the packages 14 can be performed easily and accurately.

Figure 7:
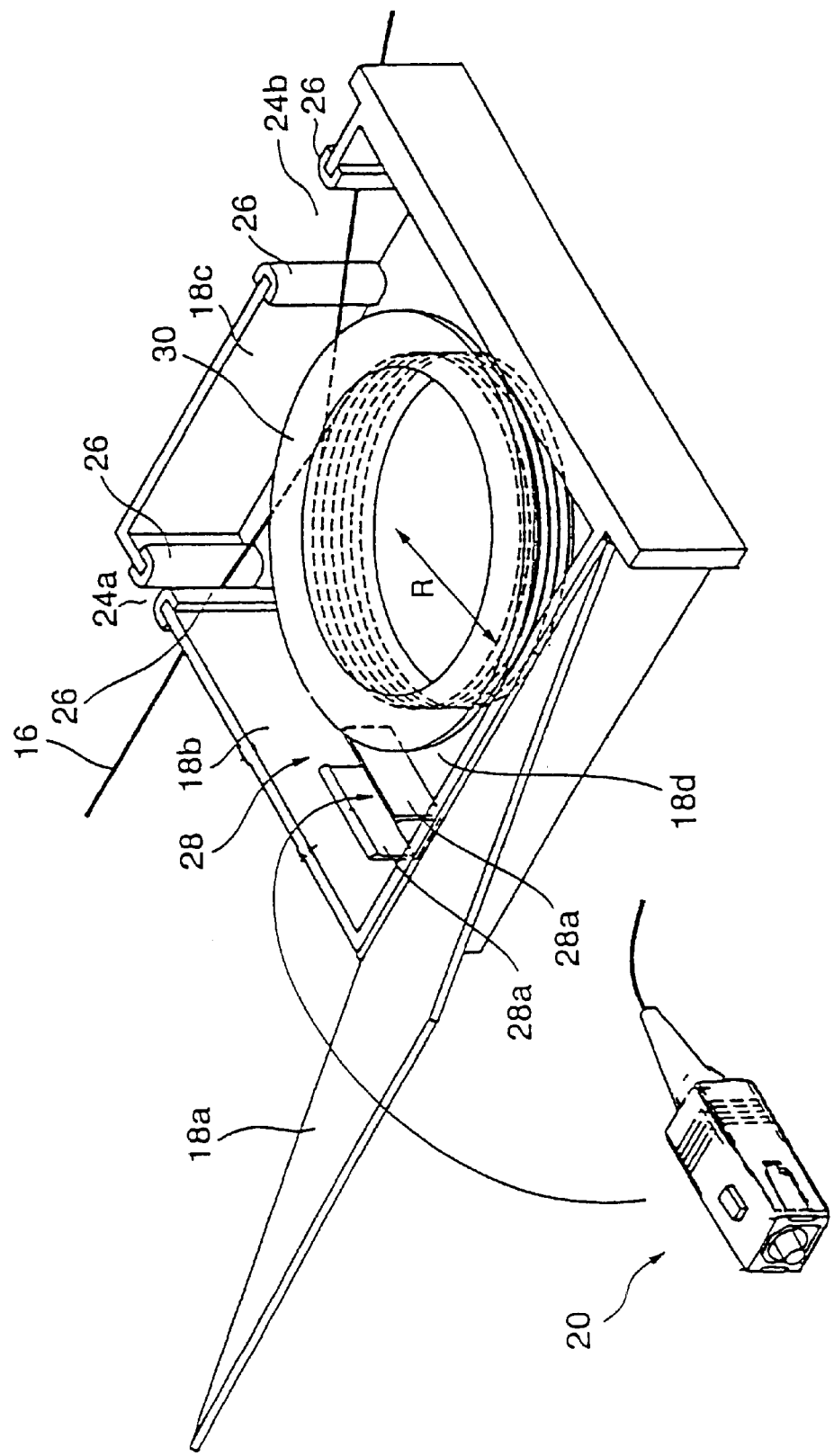
FIG. 7 is a schematic perspective view showing the cartridge, one side of which is opened, of the embodiment according to the present invention.

FIG. 7 is a schematic perspective view showing the cartridge 18.

The cartridge 18, which is formed in the shape of a rectangular body, includes an upper surface (lid) 18a which can be closed and opened. On two sides 18b and 18c of the cartridge 18, there are formed two opening portions 24a and 24b, peripheries of which may be covered with elastic member 26 such as rubber or the like. In a corner of the bottom surface of the cartridge 18, there are two plates 28a perpendicular to the bottom surface 18d which serve as a holder for a spare optical plug 20.

The excessive length part of the optical fiber 16 is wound on a reel 30, which is accommodated within the cartridge 18 and can be removably provided on the bottom surface 18d of the cartridge 18. Herein, the diameter of the reel 30 is properly designed so that the optical fiber 16 does not exceed its allowable bending strength in a tension state. Accordingly, the excessive length part of the optical fiber 16 can be accommodated in an orderly manner within the cartridge 18 without exceeding its bending strength, thereby avoiding damage from bending.

Also, the optical fiber 16, which is laid from the outside of the telecommunication apparatus 10, is first dragged into the cartridge 18 from the opening portion 24b thereof, and in order to connect to the telecommunication apparatus 10 is drawn out of the opening portion 24a thereof. Hereinafter, the opening portion 24b is referred to as an optical fiber dragging-into portion and the opening portion 24a as an optical fiber drawing-out portion. Since the optical fiber 16 contacts or rubs against the opening portions 24a and 24b via the elastic member 26 with which they are covered, it avoids being damaged.

The holder 28 serves to accommodate the optical plug 20 which is unconnected to the package 14. The holder 28 can be easily used if necessary. The optical fiber 16 is connected to the optical plug 20.

Next, a description is given of a structure of the cartridge carrying portion 22 and a method for carrying the cartridge 18 thereon, with reference to FIGS. 8A and 8B.

The cartridge carrying portion 22 includes a plurality of cartridge holding portions 32 which are each paired with a corresponding one of the cartridges 18, and a carrying stand 34 which serves to settle and arrange the cartridge holding portions 32.

With respect to the cartridge 18, as shown in FIG. 8A, the main surface 18a thereof stands vertically, and a side 18e thereof faces downward and is provided with two projections 36 on its two end portions.

The cartridge holding portion 32, which is formed as a long member, includes a groove portion 38 which is opened upwards so as to receive the cartridge 18. On one end of the cartridge holding portion 32, there are formed an extending projection 40 and a vertical engaging member 42, whereas on the other end thereof, there is formed a pair of projections 46 each having a hole portion 44 and with faces parallel to the main surface 18a.

The carrying stand 34 is formed as a long flat plate, on one end portion of which a plurality of the engaging members 48 are provided and on the other end portion of which a plurality of projections 52 each having a hole portion 50 are provided.

The two end portions of carrying stand 34 are fixed on the rear surface 12a of the shelf 12.

The cartridge holding portion 32 is arranged such that the pair of projections 46 sandwich their corresponding projection 52 of the carrying stand 34. A shaft 54 goes through the hole portions 44 and 50 to serve as a bearing mechanism. Thus, the cartridge holding portion 32 can be rotated 90° on the shaft 54 counterclockwise. And then, the cartridge holding portion 32 can be fixed on the carrying stand 34 with one touch such that the engaging member 48 engages with the projection 40. The engaging member 48 has a bias mechanism (not shown) and its engagement can be released by hand.

The side 18e of the cartridge 18 is inserted into the groove portion 38 of the cartridge holding portion 32 and the projection 36 is engaged by the engaging member 42, and thereby the cartridge 18 is fixed on the cartridge holding portion 32 with one touch (fixing mechanism). Like the engaging member 48, the engaging member 42 is also provided with a bias mechanism (not shown) and its engagement can be released by hand.

According to the structures of the cartridge 18 and the cartridge carrying portion 22, since the cartridge 18 can be easily attached to or detached from the cartridge carrying portion 22, the operation of adding or removing the optical fibers 16 to or from the packages 14 or of exchanging the cartridge 18 with another one can be performed easily and accurately. Further, the cartridge holding portion 32 and the cartridge 18 can be rotated about the shaft 54, the effects of which are described later.

Herein, a modification of the cartridge holding portion 32 and the cartridge 18 is shown in FIG. 9. In this modification, parts, which correspond to those of the cartridge holding portion 32 and the cartridge 18, are given the same reference numerals.

The modification is different from the cartridge holding portion 32 and the cartridge 18 in structure. Specifically, in the cartridge 58 of the modification, a bottom portion 58a thereof is formed of two groove portions 60 like two tracks on main surfaces 58b and 58c (the main surface 58 is not shown) thereof. And in the cartridge holding portion 62 of the modification, a groove portion 64 thereof, corresponding to the two groove portions 60, has an upper portion which is partly closed and an end portion which has an opening 64 and a projection 40 formed thereon.

The cartridge 58 is fixed on the cartridge holding portion 62 such that the groove portions 60 of the cartridge 58 are inserted into the groove portion 64 from the opening 66 of the cartridge holding portion 62 (in an arrow X direction).

According to the above-mentioned structures, since the engaging member to be used is only the engaging member 48 provided on the carrying stand 34, the telecommunication apparatus 10 can be simplified and the cartridge 58 can be easily carried on the cartridge holding portion 62.

Next, a description is given of the process of the package 14 being attached to and detached from the shelf 12, with reference to FIGS. 10A through 10E.

Figure 10A:
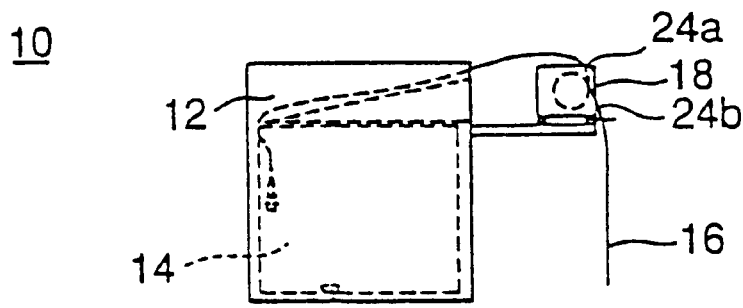
FIGS. 10A through 10E are diagrams illustrating the excessive length treatment structure using the cartridge for optical fibers according to the embodiment of the present invention.

In a state where the package 14 is accommodated in a predetermined position within the shelf 12 of the telecommunication apparatus 10, since the excessive length part of the optical fiber 16 is accommodated within the cartridge 18, the optical fiber 16 is laid out in an orderly manner without any slack as shown in FIG. 10A. Herein, the optical fiber 16 is dragged into the cartridge 18 from the optical fiber dragging-into portion 24b provided on the lower right end portion of the cartridge 18 and then drawn out of the optical fiber drawing-out portion 24a provided on the upper right end portion of the cartridge 18. In this state, since the cartridge 18 and the cartridge holding portion 32 are fixed on the carrying stand 34 by the engaging member 48 engaging with the projection 40, the engagement of the engaging member 48 with the projection 40 is released in order to proceed.

Figure 10B:
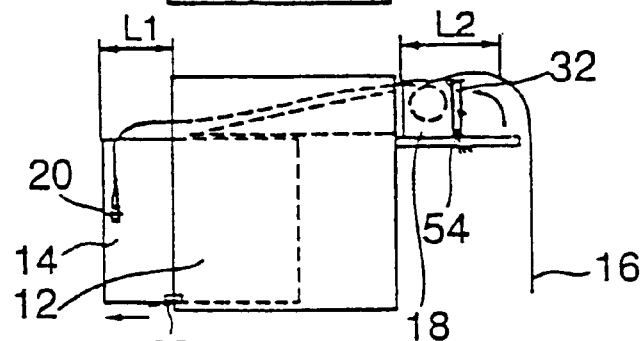
Figure 10C:
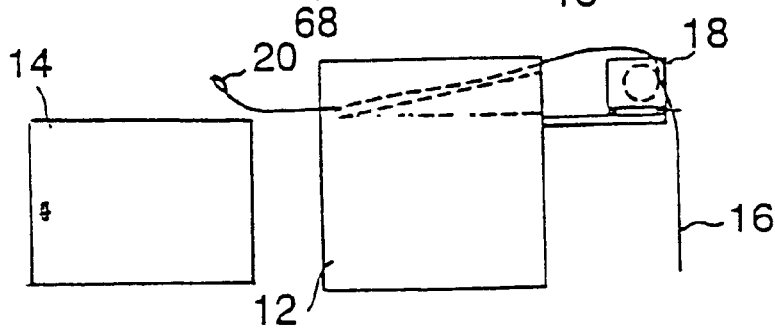

When the package 14 is drawn out of the front of the shelf 12 by a predetermined distance L, as shown in FIG. 10B, it is stopped by a lock mechanism 68 provided below shelf 12. On the other hand, with the drawing-out of the package 14, the optical fiber 16 connected to the optical plug 20 is pulled, and as a result the cartridge 18 and the cartridge holding portion 32 are gradually rotated 90° on the shaft 54 counterclockwise as shown in FIG. 10B. At this time, the optical fiber drawing-out portion 24a is rotated about the shaft 54 and is pulled forward (moving mechanism). For this reason, the optical fiber 16 is always under tension and avoids the disadvantage of the troublesome slack (see FIG. 10B).

Herein, since the movement of the optical fiber 16 caused by drawing the package 14 is approximately equal to the movement (a distance L2 in FIG. 10B) of the optical fiber 16 caused by rotating the cartridge 18 and the cartridge holding portion 32, abnormally stretching the optical fiber 16 can be avoided. Also, since the optical fiber 16, for example, has a sufficient pulling strength of 2 kgf, the optical fiber 16 is not damaged at all even though it is stretched as explained above. Accordingly, the cartridge 18 and the cartridge holding portion 32 do not need to be manually rotated 90° in advance.

In this state, by removing the optical plug 20 from the connecting adapter, the optical fiber 16 is disconnected from the package 14 and thereby is separated therefrom. Further, after the lock mechanism is released, for example, by hand, the package 14 is completely removed from the shelf 12 (see FIG. 10C).

Thereafter, for example, instead of the removed package 14, a new one is prepared, or the cartridge 18 is also detached from the cartridge holding portion 32 with one touch and relocated to another place together with the removed package 14.

Figure 10D:
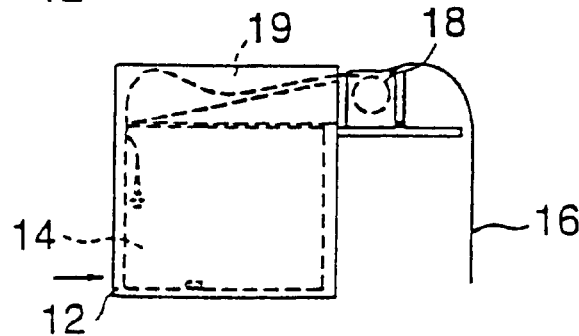
Figure 10E:
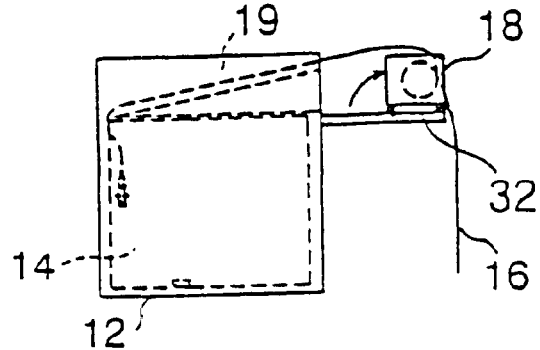

When the package 14 is accommodated within the shelf 12 again, the optical fiber 16 is in a slack state for a time in the space 19 (see FIG. 10D). Then, by manually rotating 90° the cartridge 18 and the cartridge holding portion 32 clockwise, the slack state of the optical fiber 16 in the space 19 is eliminated and, immediately, the optical fiber 16 is again laid out in an orderly manner (see FIG. 10E).

As mentioned above, the reel 30 is accommodated and fixed within the cartridge 18. Instead, the reel 30 may be rotatably fixed within the cartridge 18 as a rotary reel, and in this case the present invention can also take effect without the 90° rotation of the cartridge 18.

In addition, the excessive length treatment structure and the cartridge utilized for the optical fibers in electric equipment according to the present invention, is suitable to the above-mentioned embodiments but in which the optical fibers are laid on the rear surface of the electric equipment and are dragged into the electric equipment from the front thereof. The present invention, however, is not limited to this, in that the optical fibers may be dragged into the electric equipment from the side thereof, or the optical fibers may be laid on the front surface thereof and dragged thereinto from the rear or the side thereof, or the optical fibers may be laid on the side thereof and dragged thereinto from the rear or the front thereof.

The above description is provided in order to enable any person skilled in the art to make and use the invention and sets forth the best mode contemplated by the inventors for carrying out their invention.

The present application is based on Japanese priority application No. 11-186571 filed on Jun. 30, 1999, the entire contents of which are hereby incorporated by reference.

What is claimed is:

1. An excessive length treatment structure for optical fibers used in electric equipment, in which a plurality of packages, each of which houses a substrate module, are accommodated within a shelf, and optical fibers are introduced into said self from a rear side thereof opposite to a front side from which said packages are drawn out so as to connect to a corresponding one of said packages via an optical plug at said front side of said shelf, said excessive length treatment structure comprising:

a plurality of cartridges which are provided on and manually accessible from said rear side of said shelf for accommodating excessive length parts of said optical fibers, said cartridges moving toward the front side of the shelf in response to a tug of the optical fibers pulled by movement of the packages being drawn out, wherein said optical fibers are held under tension by said cartridges.

2. The excessive length treatment structure as claimed in claim 1, wherein the plurality of cartridges are paired with the plurality of packages, respectively.

3. The excessive length treatment structure as claimed in claim 2, wherein:

when one of said packages is drawn out of said shelf and said optical plug is thereby moved in a direction of drawing by a predetermined distance, in order to prevent the drawing of one of said packages from being disturbed due to said optical fiber becoming stretched, a moving mechanism is provided for moving the excessive length part of said optical fiber toward said front side of said shelf.

4. The excessive length treatment structure as claimed in claim 3, wherein each of said cartridges has a reel removably provided therein, said reel being stationary during attachment of said reel to one of said cartridges, said excessive length part being wound on said reel.

5. The excessive length treatment structure as claimed in claim 2, wherein:

each of said cartridges has a reel removably provided therein, said reel being stationary due to being attached to said cartridge, said excessive length part being wound on said reel, an axis of said reel being positioned perpendicularly to a direction in which each said package is drawn out;

said optical fiber is drawn out of said shelf by a maximum distance;

an end portion of each of said cartridges is rotatably supported by a shaft provided on said shelf from the rear side apposite to a side from which said packages are drawn out and are adjacent to said shelf; and when one of said packages is drawn out of said shelf and said optical plug is thereby moved in a direction of drawing by a predetermined distance, said optical fiber is stretched, said end portion of one of said cartridges from which said optical fiber is drawn out is rotated about said shaft and said excessive length part of said optical fiber is thereby moved in said direction of drawing.

6. The excessive length treatment structure as claimed in claim 1, wherein said cartridge has a rectangular shape.

7. The excessive length treatment structure as claimed in claim 1, wherein said cartridges each accommodate a corresponding one of said optical fibers.

* * * * *